(12) United States Patent
Yu et al.

(10) Patent No.: US 11,955,652 B2
(45) Date of Patent: Apr. 9, 2024

(54) BATTERY CELL AND ELECTRONIC DEVICE

(71) Applicant: Ningde Amperex Technology Limited, Ningde (CN)

(72) Inventors: Shuxian Yu, Ningde (CN); Kun Wang, Ningde (CN); Tianjing Zhang, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 0 days.

(21) Appl. No.: 17/500,314

(22) Filed: Oct. 13, 2021

(65) Prior Publication Data

US 2022/0209350 A1 Jun. 30, 2022

(30) Foreign Application Priority Data

Dec. 29, 2020 (CN) .......................... 202011591743.2

(51) Int. Cl.
*H01M 50/242* (2021.01)
*H01M 50/209* (2021.01)

(52) U.S. Cl.
CPC ....... *H01M 50/242* (2021.01); *H01M 50/209* (2021.01)

(58) Field of Classification Search
CPC ............. H01M 50/242; H01M 50/209; H01M 50/103; H01M 50/105; H01M 50/14;
(Continued)

(56) References Cited

U.S. PATENT DOCUMENTS 10,236,476 B2 3/2019 Kwon et al.
2011/0244318 A1* 10/2011 Cho ..................... H01M 50/105
429/186

(Continued)

FOREIGN PATENT DOCUMENTS

CN 1218302 A 6/1999
CN 102668226 A 9/2012
(Continued)

OTHER PUBLICATIONS

English Translation of KR 20170100983 A—Flexible battery assembly and manufacturing method thereof; Sep. 5, 2017 (Year: 2017).*
(Continued)

*Primary Examiner* — Matthew T Martin
*Assistant Examiner* — Adam J Francis
(74) *Attorney, Agent, or Firm* — Ladas & Parry LLP

(57) ABSTRACT

A battery cell includes a first electrode assembly, a second electrode assembly and a housing. In a thickness direction of the battery cell, the first electrode assembly includes a first surface and a second surface opposite to the first surface, the second electrode assembly includes a third surface and a fourth surface opposite to the third surface. A housing includes an accommodation cavity configured to accommodate the first electrode assembly and the second electrode assembly, the accommodation cavity includes a bottom wall, and the first surface and the third surface are both opposite to the bottom wall. The battery cell further includes: a first adhesive layer, including a first bonding side and a second bonding side. The first bonding side is bonded to both the second surface and the fourth surface, and the second bonding side is bonded to the housing.

20 Claims, 9 Drawing Sheets

(58) Field of Classification Search
CPC ........... H01M 10/0436; H01M 10/052; H01M 10/058; H01M 10/04; H01M 4/04
See application file for complete search history.

(56) References Cited

U.S. PATENT DOCUMENTS

| | | | | |
|---|---|---|---|---|
| 2012/0257349 | A1* | 10/2012 | Bang | H01M 50/553 361/679.55 |
| 2013/0157084 | A1* | 6/2013 | Bang | H01M 50/55 429/7 |
| 2013/0196194 | A1* | 8/2013 | Park | H01M 50/553 429/72 |
| 2013/0288104 | A1* | 10/2013 | Kang | H01M 50/557 429/153 |
| 2014/0044995 | A1* | 2/2014 | Moon | H01M 10/425 429/7 |
| 2016/0049623 | A1* | 2/2016 | Lee | H01M 50/169 429/185 |
| 2018/0175451 | A1* | 6/2018 | Inoue | H01M 50/124 |
| 2019/0319253 | A1* | 10/2019 | An | H01M 50/103 |
| 2021/0351461 | A1* | 11/2021 | Yang | H01M 50/14 |

FOREIGN PATENT DOCUMENTS

| | | |
|---|---|---|
| CN | 103227340 A | 7/2013 |
| CN | 203800127 U | 8/2014 |
| CN | 204216170 U | 3/2015 |
| CN | 206179947 U | 5/2017 |
| CN | 108206247 A | 6/2018 |
| CN | 208226003 U | 12/2018 |
| CN | 211295152 U | 8/2020 |
| CN | 211907597 U | 11/2020 |
| KR | 100760779 B1 | 9/2007 |
| KR | 20170100983 A * | 9/2017 |
| WO | 2020032538 A1 | 2/2020 |

OTHER PUBLICATIONS

Chinese Office Action corresponding to counterpart application 202011591743.2 dated Oct. 29, 2021.
European Search Report for EP Application No. 21199627.7, dated Mar. 18, 2022, 4 pages.
First Office Action of EP Application No. 21199627.7, dated Mar. 31, 2022, 9 pages.
First Office Action of CN Application No. 202011591743.2, dated Oct. 29, 2021, 6 pages.
Second Office Action of CN Application No. 202011591743.2, dated Dec. 24, 2021, 5 pages.
Notice of refusal of patent for CN Application No. 202011591743.2, dated Feb. 14, 2022, 4 pages.
Decision of re-examination for CN Application No. 202011591743.2, dated Sep. 15, 2022, 10 pages.
Notice of allowance and supplemental search report for CN Application No. 202011591743.2, dated Jan. 5, 2023.

* cited by examiner

BATTERY CELL AND ELECTRONIC DEVICE

CROSS-REFERENCE TO RELATED APPLICATIONS

This application claims the benefit of priority from the Chinese Patent Application No. 202011591743.2 filed on Dec. 29, 2020, which is incorporated herein by reference in its entirety.

TECHNICAL FIELD

This application relates to the field of lithium-ion batteries, and in particular, to a battery cell and an electronic device.

BACKGROUND

Currently, pouch-type lithium-ion batteries are widely used in the field of electronic devices. In fixing a battery cell that contains two or more electrode assemblies, the two or more electrode assemblies are usually fixed to a housing separately by glue.

Referring to FIG. 1 and FIG. 2, the battery cell 1 includes a first electrode assembly 11 and a second electrode assembly 12 that are disposed in parallel. The two electrode assemblies are accommodated in a housing 13 and are fixed onto a wall face of the housing 13 separately by glue G. The housing 13 is usually a soft packaging bag. When the battery drops, the two electrode assemblies will pull each other and dangle repeatedly, thereby bursting a top seal or the housing open and leading to electrolyte leakage.

SUMMARY

In view of the defects in existing technologies, an objective of this application is to provide a battery cell and an electronic device in an attempt to reduce the impact caused by electrode assemblies onto a housing and effectively reduce occurrence of electrolyte leakage.

To achieve the foregoing objective, this application provides a battery cell, including: a first electrode assembly, the first electrode assembly includes a first surface and a second surface opposite to the first surface; a second electrode assembly disposed adjacent to the first electrode assembly in a thickness direction of the battery cell, the second electrode assembly includes a third surface and a fourth surface opposite to the third surface; and a housing, including an accommodation cavity configured to accommodate the first electrode assembly and the second electrode assembly, where the accommodation cavity includes a bottom wall, and the first surface and the third surface are opposite to the bottom wall. The battery cell further includes a first adhesive layer. The first adhesive layer includes a first bonding side and a second bonding side opposite to the first bonding side. The first bonding side is bonded to both the second surface and the fourth surface, and the second bonding side is bonded to the housing.

In some embodiments, in a width direction of the battery cell, the first adhesive layer overlays a first centrosymmetric line of the first electrode assembly and/or the second electrode assembly in the width direction thereof; or, in a length direction of the battery cell, the first adhesive layer overlays a second centrosymmetric line of the first electrode assembly and/or the second electrode assembly in the length direction thereof.

In some embodiments, the first electrode assembly includes a first end face, a second end face opposite to the first end face, a first lateral face, and a second lateral face opposite to the first lateral face. The first end face and the second end face each are connected to the first lateral face, the second lateral face, the first surface, and the second surface.

The second electrode assembly includes a third end face, a fourth end face opposite to the third end face, a third lateral face, and a fourth lateral face opposite to the third lateral face. The third end face and the fourth end face each are connected to the third lateral face, the fourth lateral face, the third surface, and the fourth surface. The second lateral face is opposite to the third lateral face. The first end face and the third end face are opposite to an identical side wall of the accommodation cavity. The battery cell further includes a second adhesive layer. A part of the second adhesive layer is bonded to the first surface, the first end face, and the second surface. Another part of the second adhesive layer is bonded to the third surface, the third end face, and the fourth surface.

In some embodiments, the battery cell further includes a first tab led out from the second end face, a second tab led out from the fourth end face, and a third adhesive layer. The third adhesive layer is disposed between the first tab and the second tab. A part of the third adhesive layer is bonded to the first surface, the second end face, and the second surface. Another part of the third adhesive layer is bonded to the third surface, the fourth end face, and the fourth surface.

In some embodiments, the battery cell further includes a first buffer layer. The first buffer layer is disposed between the first lateral face and the side wall of the housing, between the first end face and the side wall of the housing, the third end face and the side wall of the housing, and between the fourth lateral face and the side wall of the housing.

In some embodiments, the battery cell further includes a second buffer layer. The second buffer layer is disposed between the first lateral face and the side wall of the housing, between the second end face and the side wall of the housing, the fourth end face and the side wall of the housing, and between the fourth lateral face and the side wall of the housing.

In some embodiments, the battery cell further includes a third buffer layer. The third buffer layer is disposed between the second lateral face and the third lateral face.

In some embodiments, a length of the first electrode assembly is greater than a length of the second electrode assembly. The battery cell further includes a fourth adhesive layer. The fourth adhesive layer is bonded to the first surface, a first end face, and the second surface.

In some embodiments, the accommodation cavity includes a first accommodation cavity configured to accommodate the first electrode assembly and a second accommodation cavity configured to accommodate the second electrode assembly. The first accommodation cavity includes a first bottom wall. The first surface is opposite to the first bottom wall. The second accommodation cavity includes a second bottom wall. The third surface is opposite to the second bottom wall.

In some embodiments, this application provides an electronic device, including the foregoing battery cell.

Beneficial effects of this application are as follows: The first bonding side of the first adhesive layer is bonded to both the second surface and the fourth surface, and the second bonding side is bonded to the housing, thereby fixing the two electrode assemblies more closely, reducing relative dangling, reducing the impact caused by the electrode assemblies onto the housing, and effectively reducing occurrence of electrolyte leakage.

REFERENCE NUMERALS

1. Battery cell;
11. First electrode assembly;
111. First surface
112. Second surface
113. First end face;
114. Second end face;
115. First lateral face;
116. Second lateral face;
117: First tab;
12. Second electrode assembly;
121. Third surface;
122. Fourth surface;
123. Third end face;
124. Fourth end face;
125. Third lateral face;
126. Fourth lateral face;
127: Second tab;
13: Housing;
131. Accommodation cavity;
W. Bottom wall;
S: Side wall;
1311. First accommodation cavity;
W1. First bottom wall;
1312. Second accommodation cavity;
W2. Second bottom wall;
14. First adhesive layer;
141. First bonding side;
142. Second bonding side;
15. Second adhesive layer;
16. Third adhesive layer;
17. Fourth adhesive layer;
B1. First buffer layer;
B2. Second buffer layer;
B3. Third buffer layer;
2. Jelly-roll electrode assembly;
21. Positive electrode plate;
22. Negative electrode plate
23: Separator;
3. Finishing adhesive;
D. Finish end;
L. Length direction;
W: Width direction;
T: Thickness direction;
L1. First centrosymmetric line;
L2. Second centrosymmetric line; and
L3. Fold line.

DETAILED DESCRIPTION

The drawings show the embodiments of this application. Understandably, the disclosed embodiments are merely examples of this application, and this application may be implemented in various forms. Therefore, the details disclosed herein are not to be construed as a limitation, but are merely intended as a basis of the claims and as a representative basis for teaching a person of ordinary skill in the art to implement this application in various forms.

Reference to "embodiment" herein means that a specific feature, structure or characteristic described with reference to the embodiment may be included in at least one embodiment of this application. The reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

The following describes a battery cell 1 and an electronic device according to this application in detail with reference to drawings.

Figure 1:
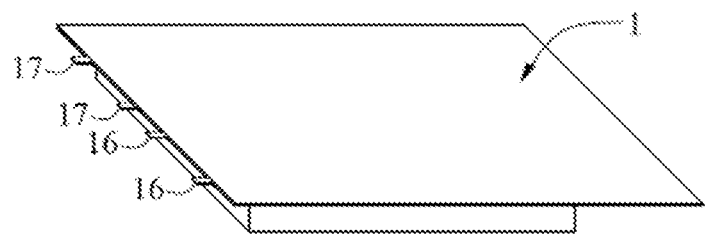
FIG. 1 is a three-dimensional schematic structural diagram of a battery in background technology.
Figure 2:
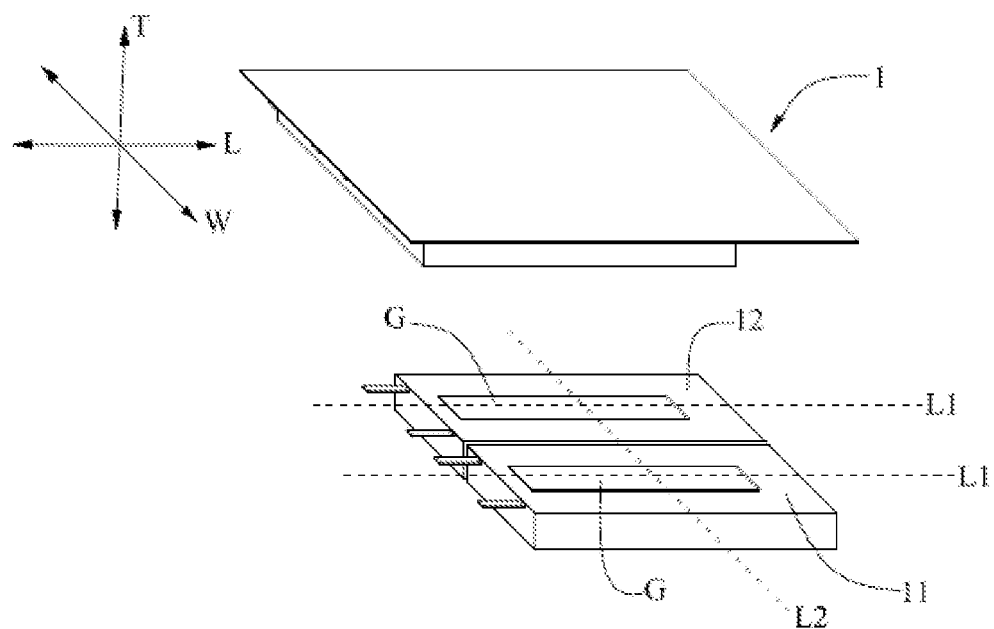
FIG. 2 is a three-dimensional schematic diagram of a battery cell shown in FIG. 1.
Figure 3:
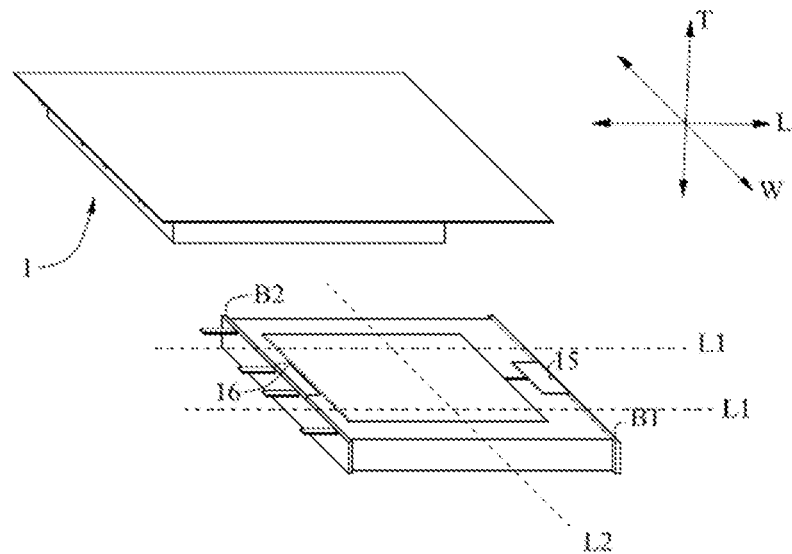
FIG. 3 is a three-dimensional schematic diagram of a battery and a battery cell thereof according to an embodiment of this application.
Figure 4:
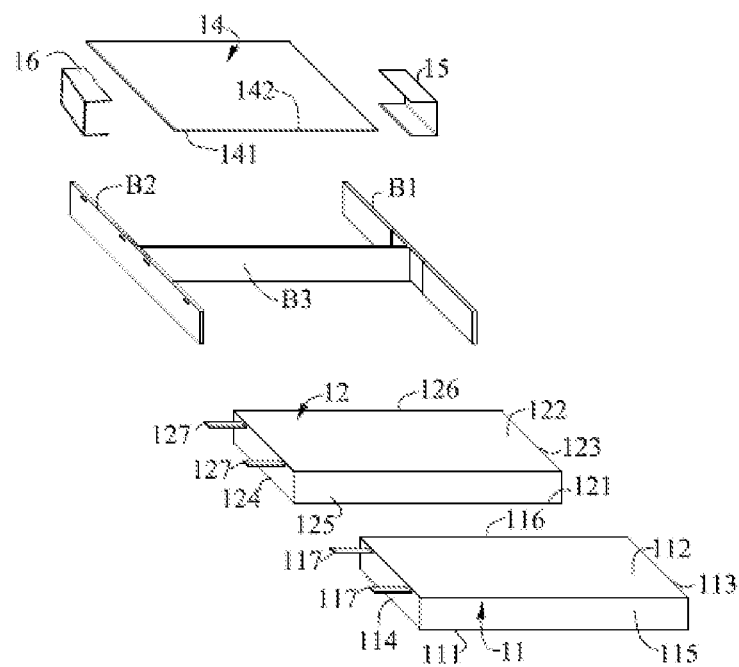
FIG. 4 is a three-dimensional schematic exploded view of the battery cell shown in FIG. 3.
Figure 5:
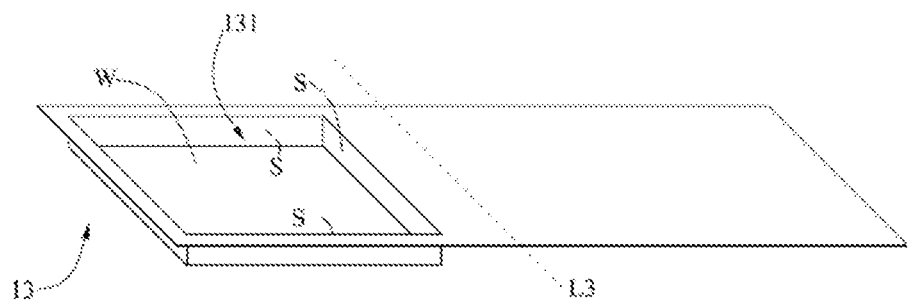
FIG. 5 is a schematic expanded view of a housing shown in FIG. 3.

Referring to FIG. 3 to FIG. 5, the battery cell 1 includes: a first electrode assembly 11, where, in a thickness direction T of the battery cell 1, the first electrode assembly 11 includes a first surface 111 and a second surface 112 opposite to the first surface 111; a second electrode assembly 12, adjacent to the first electrode assembly 11, where, in the thickness direction T of the battery cell 1, the second electrode assembly 12 includes a third surface 121 and a fourth surface 122 opposite to the third surface 121; and a housing 13, including an accommodation cavity 131 configured to accommodate the first electrode assembly 11 and the second electrode assembly 12. The accommodation cavity 131 includes a bottom wall W. The first surface 111 and the third surface 121 are opposite to the bottom wall W. The battery cell 1 further includes a first adhesive layer 14. The first adhesive layer 14 includes a first bonding side 141 and a second bonding side 142 opposite to the first bonding side 141. The first bonding side 141 is bonded to both the second surface 112 and the fourth surface 122, and the second bonding side 142 is bonded to the housing 13.

In some embodiments, the first adhesive layer 14 includes one of glue, double-sided tape, or the like. The thickness of typical double-sided tape is 10 to 48 μm. A distance between the first adhesive layer 14 and the edge of the electrode assembly may be selected as required. The housing 13 is formed by folding a soft package sealing film along a fold line L3.

The first bonding side 141 of the first adhesive layer 14 is bonded to both the second surface 112 and the fourth surface 122. The second bonding side 142 is bonded to the housing 13. In contrast with the prior art, this design fixes the first electrode assembly 11 and the second electrode assembly 12 more closely, reduces relative dangling, reduces the impact caused by the electrode assemblies onto the housing 13, and effectively reduces occurrence of electrolyte leakage.

Figure 7:
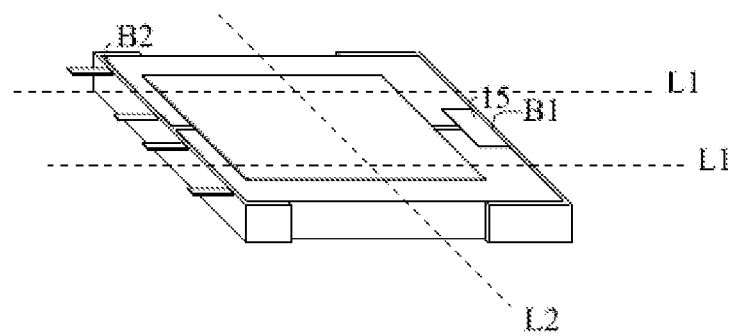
FIG. 7 is a three-dimensional schematic diagram of a battery and a battery cell thereof according to another embodiment of this application.
Figure 9:
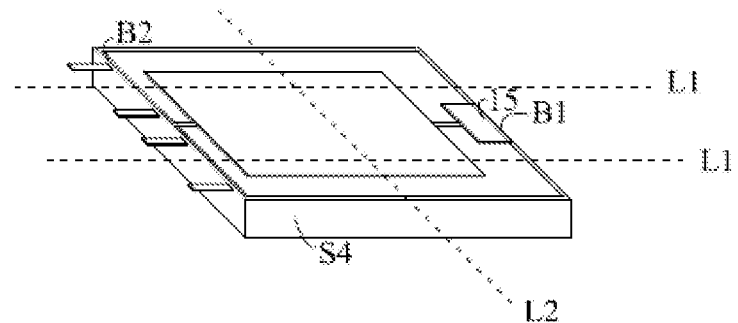
FIG. 9 is a three-dimensional schematic diagram of a battery and a battery cell thereof according to another embodiment of this application.

Referring to FIG. 3, FIG. 7, and FIG. 9, in some embodiments, in a width direction W of the battery cell 1, the first adhesive layer 14 overlays a first centrosymmetric line L1 of the first electrode assembly 11 and/or the second electrode assembly 12 in the width direction W thereof; or, in a length direction L of the battery cell 1, the first adhesive layer 14 overlays a second centrosymmetric line L2 of the first electrode assembly 11 and/or the second electrode assembly 12 in the length direction L thereof.

The first adhesive layer 14 overlays the first centrosymmetric line L1 of the first electrode assembly 11 and/or the second electrode assembly 12, or, the first adhesive layer 14 overlays the second centrosymmetric line L2 of the first electrode assembly 11 and/or the second electrode assembly 12, thereby increasing the length or width of the first adhesive layer 14, the area of the first adhesive layer 14, and the bonding force between the electrode assembly and the housing 13, and reducing the impact caused by the electrode assemblies onto the housing 13.

Referring to FIG. 3, FIG. 4, and FIG. 7 to FIG. 10, in some embodiments, the first electrode assembly 11 includes a first end face 113, a second end face 114 opposite to the first end face 113, a first lateral face 115, and a second lateral face 116 opposite to the first lateral face 115. The first end face 113 and the second end face 114 each are connected to the first lateral face 115, the second lateral face 116, the first surface 111, and the second surface 112. The second electrode assembly 12 includes a third end face 123, a fourth end face 124 opposite to the third end face 123, a third lateral face 125, and a fourth lateral face 126 opposite to the third lateral face 125. The third end face 123 and the fourth end face 124 each are connected to the third lateral face 125, the fourth lateral face 126, the third surface 121, and the fourth surface 122. The second lateral face 116 is opposite to the third lateral face 125. The first end face 113 and the third end face 123 are opposite to an identical side wall of the accommodation cavity 131. The battery cell 1 further includes a second adhesive layer 15. A part of the second adhesive layer 15 is bonded to the first surface 111, the first end face 113, and the second surface 112. Another part of the second adhesive layer 15 is bonded to the third surface 121, the third end face 123, and the fourth surface 122.

The second adhesive layer 15 may span the entire width direction W of the first electrode assembly 11 and the second electrode assembly 12, or may span a part of the width direction W of the first electrode assembly 11 and the second electrode assembly 12. The second adhesive layer 15 is bonded to both the first electrode assembly 11 and the second electrode assembly 12, thereby further increasing the degree of integration of the first electrode assembly 11 and the second electrode assembly 12 and reducing the dangling of the first electrode assembly 11 and the second electrode assembly 12 against each other.

Referring to FIG. 3 and FIG. 4, in some embodiments, the battery cell 1 further includes a first tab 117 led out from the second end face 114, a second tab 127 led out from the fourth end face 124, and a third adhesive layer 16. The third adhesive layer 16 is disposed between the first tab 117 and the second tab 127. A part of the third adhesive layer 16 is bonded to the first surface 111, the second end face 114, and the second surface 112. Another part of the third adhesive layer 16 is bonded to the third surface 121, the fourth end face 124, and the fourth surface 122.

The third adhesive layer 16 may span the entire width direction W of the first electrode assembly 11 and the second electrode assembly 12, or may span a part of the width direction W of the first electrode assembly 11 and the second electrode assembly 12. The third adhesive layer 16 is disposed opposite to the second adhesive layer 15 in the length direction L, thereby increasing the degree of integration of the first electrode assembly 11 and the second electrode assembly 12 and reducing the dangling of the first electrode assembly 11 and the second electrode assembly 12 against each other. In some embodiments, the first tab 117 and a main body of the first electrode assembly 11 are integrally formed, and the second tab 127 and a main body of the second electrode assembly 12 are integrally formed, thereby simplifying the manufacturing process and improving production efficiency.

Figure 8:
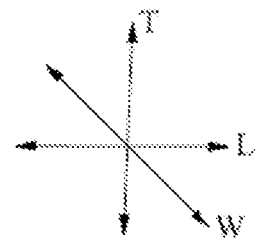
FIG. 8 is a three-dimensional schematic diagram of a buffer layer shown in FIG. 7.
Figure 8:
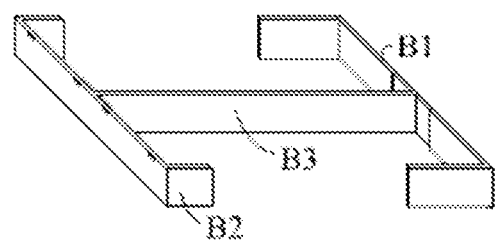
Figure 10:
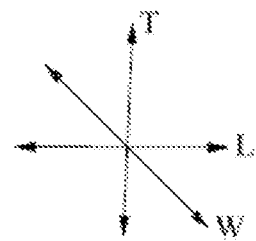
FIG. 10 is a three-dimensional schematic diagram of a buffer layer shown in FIG. 9.
Figure 10:
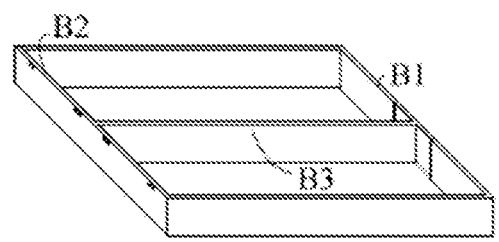
Figure 11:
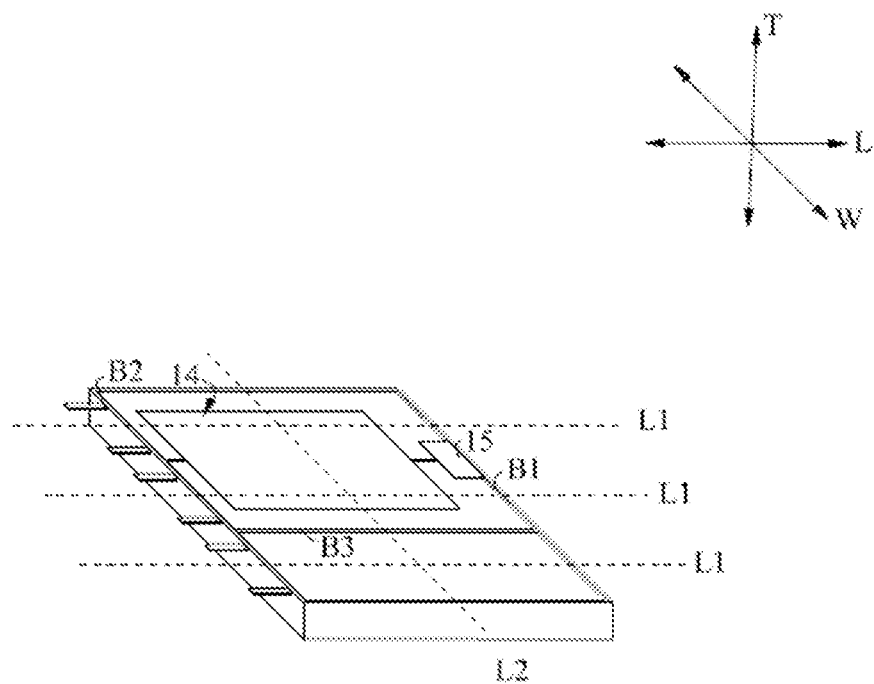
FIG. 11 is a three-dimensional schematic diagram of a battery cell according to another embodiment of this application.

Referring to FIG. 3, FIG. 4, FIG. 7, FIG. 8, FIG. 9, and FIG. 10, in some embodiments, the battery cell 1 further includes a first buffer layer B1. The first buffer layer B1 is disposed between the first lateral face 115 and the side wall of the housing 13, between the first end face 113 and the side wall of the housing, the third end face 123 and the side wall of the housing, and between the fourth lateral face 126 and the side wall of the housing. Alternatively, referring to FIG. 3 and FIG. 4, the first buffer layer B1 may be disposed just between the first end face 113 and the side wall of the housing 13 and between the third end face 123 and the side wall of the housing. Referring to FIG. 7 and FIG. 8, a part of the first buffer layer B1 between the first lateral face 115 and the side wall of the housing 13, and/or between the fourth lateral face 126 and the side wall of the housing, may overlay just a part of the first lateral face 115 and/or the fourth lateral face 126. Referring to FIG. 9 and FIG. 10, a part of the first buffer layer B1 between the first lateral face 115 and the side wall of the housing 13, and/or between the fourth lateral face 126 and the side wall of the housing, may overlay the entirety of the first lateral face 115 and/or the fourth lateral face 126. In some embodiments, the first buffer layer B1 is a silicone pad. The silicone pad is fixed between the electrode assembly and the side wall of the housing 13 by glue or injection molding.

Referring to FIG. 3, FIG. 4, FIG. 7, FIG. 8, FIG. 9, and FIG. 10, in some embodiments, the battery cell 1 further includes a second buffer layer B2. The second buffer layer B2 is disposed between the first lateral face 115 and the side wall of the housing 13, between the second end face 114 and the side wall of the housing, the fourth end face 124 and the side wall of the housing, and between the fourth lateral face 126 and the side wall of the housing. Alternatively, referring to FIG. 3 and FIG. 4, the second buffer layer B2 may be disposed just between the second end face 114 and the side wall of the housing 13 and between the fourth end face 124 and the side wall of the housing. In some embodiments, the second buffer layer B2 is a silicone pad. The silicone pad is fixed between the electrode assembly and the side wall of the housing 13 by glue or injection molding. In some embodiments, the second buffer layer B2 is a silicone pad. The silicone pad is fixed between the electrode assembly and the side wall of the housing 13 by glue or injection molding.

By virtue of characteristics such as high compressibility, softness, elasticity, low thermal conductivity, durability, and high temperature resistance, the silicone pad can serve functions such as cushioning, fastening, skid resisting, vibration resisting, electrostatic protection, and high temperature resisting for the electrode assemblies, protect the electrode assemblies more effectively, and reduce the dangling of the two electrode assemblies against each other. Any thickness of the silicone pad is appropriate as long as the silicone pad occupies a small space and improves the drop effect. On the one hand, the smaller the thickness, the smaller the loss of the energy density. On the other hand, the greater the thickness, the better the cushioning effect, and the more effectively the drop effect is improved. Therefore, an optimal value of the thickness is selected in view of a trade-off between the energy density and the improvement of the drop effect.

Referring to FIG. 3, FIG. 4, FIG. 7, FIG. 8, FIG. 9, and FIG. 10, in some embodiments, the battery cell 1 further includes a third buffer layer B3. The third buffer layer B3 is disposed between the second lateral face 116 and the third lateral face 125. This cushions the impact force between the first electrode assembly 11 and the second electrode assembly 12, avoids occurrence of electrolyte leakage, and improves the drop effect of the battery cell 1.

Figure 12:
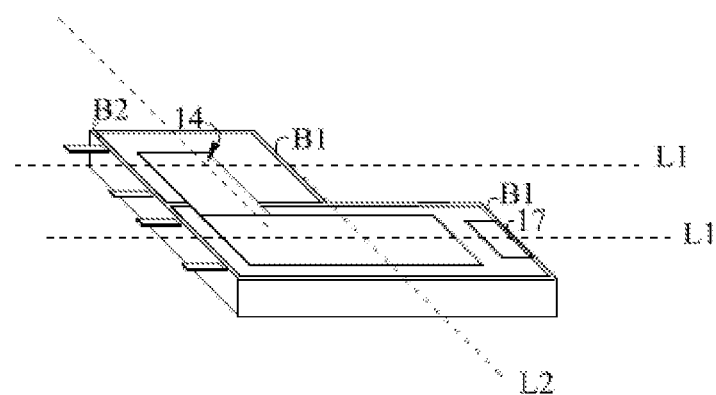
FIG. 12 is a three-dimensional schematic diagram of a battery cell according to another embodiment of this application.
Figure 13:
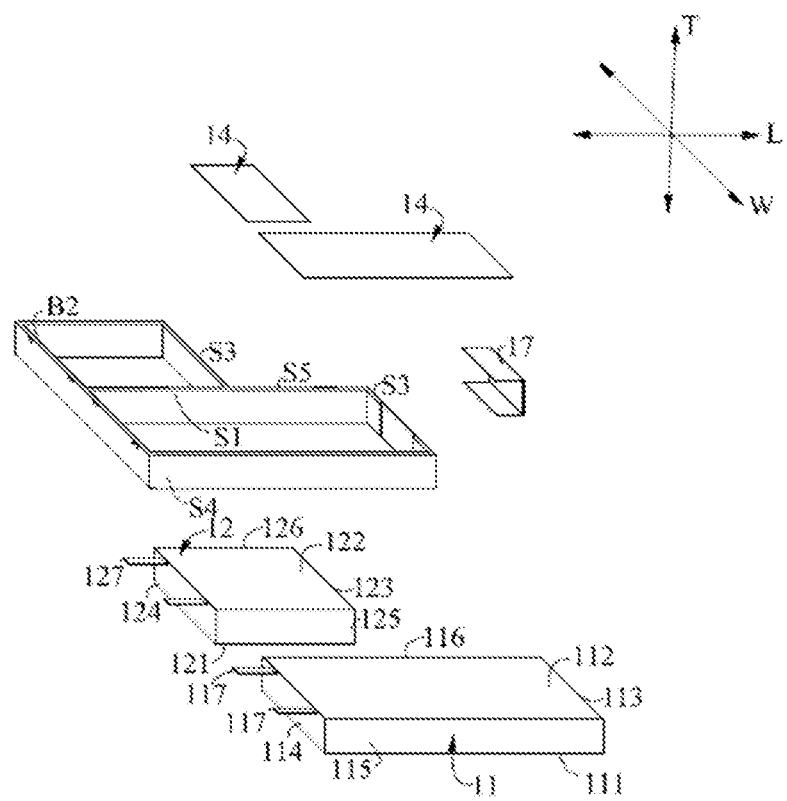
FIG. 13 is a three-dimensional schematic exploded view of FIG. 12.
Figure 14:
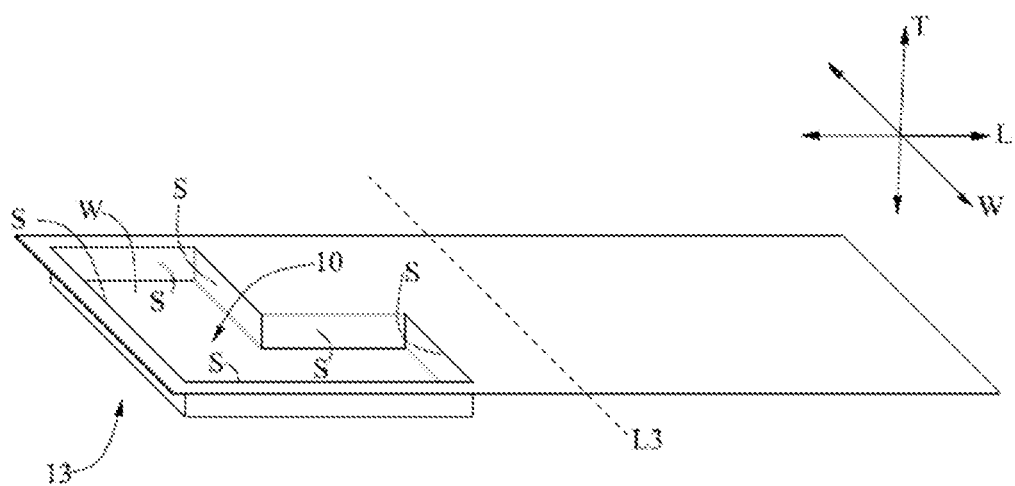
FIG. 14 is a three-dimensional schematic diagram of a housing shown in FIG. 12.

Referring to FIG. 12 and FIG. 13, in some embodiments, the length of the first electrode assembly 11 is greater than the length of the second electrode assembly 12. The battery cell 1 further includes a fourth adhesive layer 17. The fourth adhesive layer 17 is bonded to the first surface 111, the first end face 113, and the second surface 112. In a case that the first electrode assembly 11 and the second electrode assembly 12 differ in size, in order to increase the degree of integration of the first electrode assembly 11 and the second electrode assembly 12, the first adhesive layer 14 preferably overlays a first center line of the first electrode assembly 11, a second center line of the first electrode assembly 11, a first center line of the second electrode assembly 12, and a second center line of the second electrode assembly 12.

Figure 6:
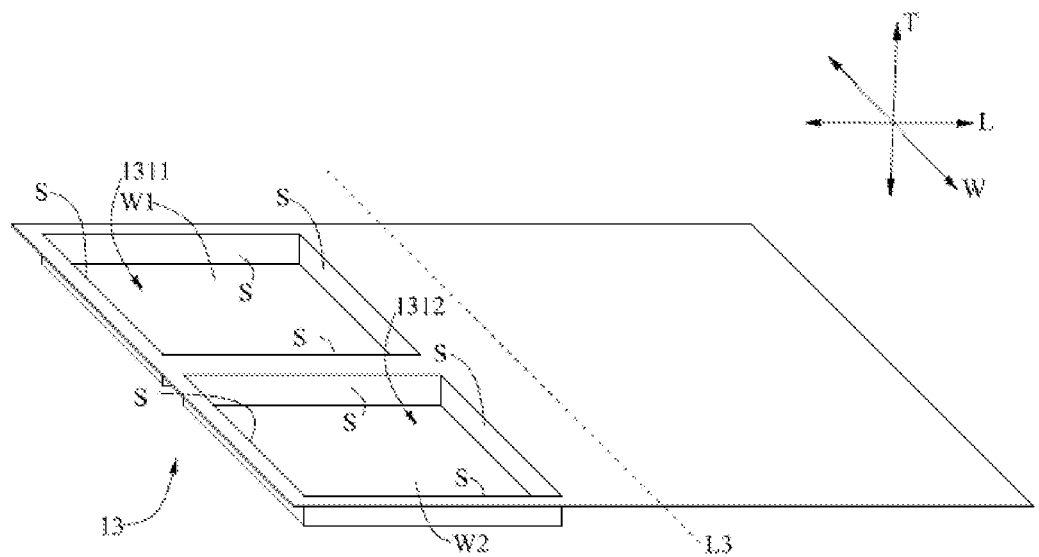
FIG. 6 is a schematic expanded view of a housing according to another embodiment of this application.

Referring to FIG. 6, in some embodiments, the accommodation cavity 131 includes a first accommodation cavity 1311 configured to accommodate the first electrode assembly 11 and a second accommodation cavity 1312 configured to accommodate the second electrode assembly 12. The first accommodation cavity 1311 includes a first bottom wall W1. The first surface 111 is opposite to the first bottom wall W1. The second accommodation cavity 1312 includes a second bottom wall W2. The third surface 121 is opposite to the second bottom wall W2. In other words, the first electrode assembly 11 and the second electrode assembly 12 are accommodated in the first accommodation cavity 1311 and the second accommodation cavity 1312 respectively.

Figure 15:
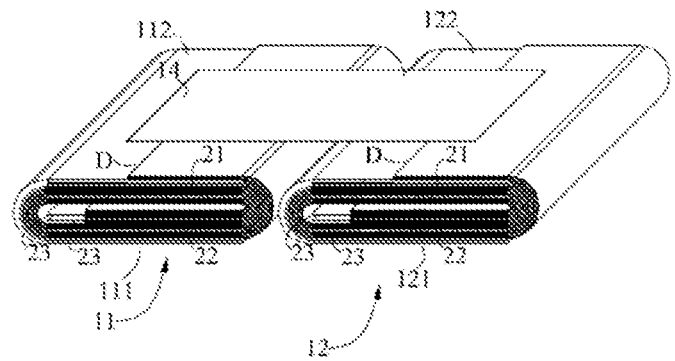
FIG. 15 is a three-dimensional schematic structural diagram of an assembling relationship between a jelly-roll battery cell and a first adhesive layer according to an embodiment of this application.
Figure 16:
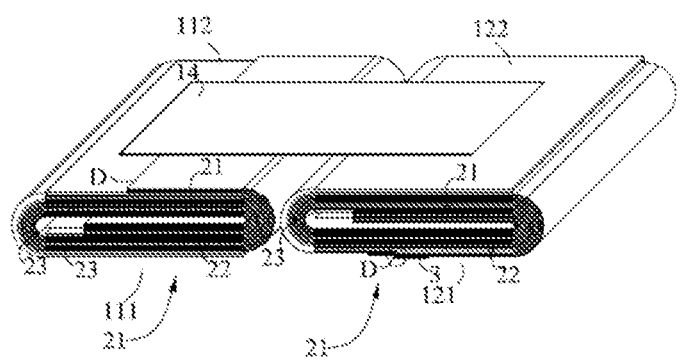
FIG. 16 is a three-dimensional schematic structural diagram of an assembling relationship between a jelly-roll battery cell and a first adhesive layer according to another embodiment of this application.
Figure 17:
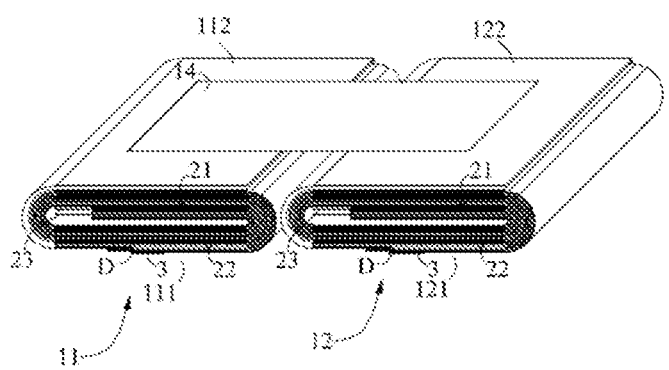
FIG. 17 is a three-dimensional schematic structural diagram of an assembling relationship between a jelly-roll battery cell and a first adhesive layer according to another embodiment of this application.

Referring to FIG. 15 to FIG. 17, the jelly-roll electrode assembly 2 is formed by winding a positive electrode plate 21, a negative electrode plate 22, and a separator 23 located between the positive electrode plate 21 and the negative electrode plate 22. At a finish end D of the jelly-roll electrode assembly, a finishing adhesive 3 is generally disposed to prevent the positive electrode plate 21, the negative electrode plate 22, and the separator 23 from falling apart. Referring to FIG. 17, when the first electrode assembly 11 and the second electrode assembly 12 are both jelly-roll electrode assemblies 2, and when the finish end D of the first electrode assembly 11 and the finish end D of the second electrode assembly 12 are located on the second surface 112 and the fourth surface 122 respectively, the first adhesive layer 14 can not only improve the degree of integration of the first electrode assembly 11 and the second electrode assembly 12, but also serve as a finishing adhesive 3 of the first electrode assembly 11 and the second electrode assembly 12 to fix the finish end D. Referring to FIG. 16, when the finish end D of the first electrode assembly 11 is located on the second surface 112 and the finish end D of the second electrode assembly 12 is located on the third surface 121, the first adhesive layer 14 may be used as the finishing adhesive 3 of the first electrode assembly 11 to fix the finish end D of the first electrode assembly.

In some embodiments, this application further provides an electronic device, including any of the battery cells 1 described above.

The foregoing descriptions are merely exemplary embodiments of this application, but are not intended to limit this application. A person skilled in the art understands that this application may have various modifications and variations. Any modifications, equivalent replacements, improvements, and the like made without departing from the spirit and principles of this application fall within the protection scope of this application.

What is claimed is:

1. A battery cell, comprising:
a first electrode assembly, composed of first positive electrode plate, a first negative electrode plate and a first separator located between first positive electrode plate and the first negative electrode plate; the first electrode assembly comprising a first surface and a second surface opposite to the first surface;
a second electrode assembly disposed adjacent to the first electrode assembly, the second electrode assembly composed of a second positive electrode plate, a second negative electrode plate and a second separator located between second positive electrode plate and the second negative electrode plate; the second electrode assembly comprising a third surface and a fourth surface opposite to the third surface;
a housing comprising a top cover and an accommodation cavity for accommodating the first electrode assembly and the second electrode assembly, the accommodation cavity comprising a bottom wall; the first surface and the third surface facing towards the bottom wall;
an electrolyte disposed in the housing; and
a first adhesive layer comprising a first bonding side and a second bonding side opposite to the first bonding side, the first bonding side is bonded to both the second surface and the fourth surface,
wherein the top cover is placed above the first electrode assembly and the second electrode assembly to seal the accommodation cavity, and the top cover is bonded to the second bonding side.

2. The battery cell according to claim 1, wherein,
in a width direction of the battery cell, the first adhesive layer overlays a first centrosymmetric line of the first electrode assembly and/or the second electrode assembly in the width direction thereof; or,
in a length direction of the battery cell, the first adhesive layer overlays a second centrosymmetric line of the first electrode assembly and/or the second electrode assembly in the length direction thereof.

3. The battery cell according to claim 1, wherein the first electrode assembly comprises a first end face, a second end face opposite to the first end face, a first lateral face, and a second lateral face opposite to the first lateral face; and the first end face and the second end face each are connected to the first lateral face, the second lateral face, the first surface, and the second surface;
the second electrode assembly comprises a third end face, a fourth end face opposite to the third end face, a third lateral face, and a fourth lateral face opposite to the third lateral face; the third end face and the fourth end face each are connected to the third lateral face, the fourth lateral face, the third surface, and the fourth surface; the second lateral face is opposite to the third lateral face, and the first end face and the third end face are opposite to an identical side wall of the accommodation cavity; and
the battery cell further comprises a second adhesive layer, a part of the second adhesive layer is bonded to the first surface, the first end face, and the second surface; and another part of the second adhesive layer is bonded to the third surface, the third end face, and the fourth surface.

4. The battery cell according to claim 3, further comprising a first tab led out from the second end face, a second tab led out from the fourth end face, and a third adhesive layer; the third adhesive layer is disposed between the first tab and the second tab; a part of the third adhesive layer is bonded to the first surface, the second end face, and the second surface; and another part of the third adhesive layer is bonded to the third surface, the fourth end face, and the fourth surface.

5. The battery cell according to claim 3, further comprising a first buffer layer, and the first buffer layer is disposed between the first lateral face and the side wall of the housing, between the first end face and the side wall of the housing, the third end face and the side wall of the housing, and between the fourth lateral face and the side wall of the housing.

6. The battery cell according to claim 5, further comprising a second buffer layer, and the second buffer layer is disposed between the first lateral face and the side wall of the housing, between the second end face and the side wall of the housing, the fourth end face and the side wall of the housing, and between the fourth lateral face and the side wall of the housing.

7. The battery cell according to claim 6, further comprising a third buffer layer, and the third buffer layer is disposed between the second lateral face and the third lateral face.

8. The battery cell according to claim 4, wherein a length of the first electrode assembly is greater than a length of the second electrode assembly, the battery cell further comprises a fourth adhesive layer, and the fourth adhesive layer is bonded to the first surface, a first end face, and the second surface.

9. The battery cell according to claim 1, wherein the accommodation cavity comprises a first accommodation cavity configured to accommodate the first electrode assembly and a second accommodation cavity configured to accommodate the second electrode assembly, the first accommodation cavity comprises a first bottom wall, the first surface faces towards the first bottom wall, the second accommodation cavity comprises a second bottom wall, and the third surface faces towards the second bottom wall.

10. An electronic device, wherein the electronic device comprises a battery cell, the battery cell comprising:
a first electrode assembly, composed of first positive electrode plate, a first negative electrode plate and a first separator located between first positive electrode plate and the first negative electrode plate; the first electrode assembly comprising a first surface and a second surface opposite to the first surface;
a second electrode assembly disposed adjacent to the first electrode assembly, the second electrode assembly composed of a second positive electrode plate, a second negative electrode plate and a second separator located between second positive electrode plate and the second negative electrode plate; the second electrode assembly comprising a third surface and a fourth surface opposite to the third surface;
a housing, comprising a top cover and an accommodation cavity for accommodating the first electrode assembly and the second electrode assembly, the accommodation cavity comprising a bottom wall; the first surface and the third surface facing towards the bottom wall;
an electrolyte disposed in the housing; and
a first adhesive layer comprising a first bonding side and a second bonding side opposite to the first bonding side, the first bonding side is bonded to both the second surface and the fourth surface,
wherein the top cover is placed above the first electrode assembly and the second electrode assembly to seal the accommodation cavity, and the top cover is bonded to the second bonding side.

11. The electronic device according to claim 10, wherein,
in a width direction of the battery cell, the first adhesive layer overlays a first centrosymmetric line of the first electrode assembly and/or the second electrode assembly in the width direction thereof; or,
in a length direction of the battery cell, the first adhesive layer overlays a second centrosymmetric line of the first electrode assembly and/or the second electrode assembly in the length direction thereof.

12. The electronic device according to claim 10, wherein the first electrode assembly comprises a first end face, a second end face opposite to the first end face, a first lateral face, and a second lateral face opposite to the first lateral face; and the first end face and the second end face each are connected to the first lateral face, the second lateral face, the first surface, and the second surface;
the second electrode assembly comprises a third end face, a fourth end face opposite to the third end face, a third lateral face, and a fourth lateral face opposite to the third lateral face; the third end face and the fourth end face each are connected to the third lateral face, the fourth lateral face, the third surface, and the fourth surface; the second lateral face is opposite to the third lateral face, and the first end face and the third end face are opposite to an identical side wall of the accommodation cavity; and
the battery cell further comprises a second adhesive layer, a part of the second adhesive layer is bonded to the first surface, the first end face, and the second surface; and another part of the second adhesive layer is bonded to the third surface, the third end face, and the fourth surface.

13. The electronic device according to claim 12, further comprising a first tab led out from the second end face, a second tab led out from the fourth end face, and a third adhesive layer; the third adhesive layer is disposed between the first tab and the second tab; a part of the third adhesive layer is bonded to the first surface, the second end face, and the second surface; and another part of the third adhesive layer is bonded to the third surface, the fourth end face, and the fourth surface.

14. The electronic device according to claim 12, further comprising a first buffer layer, and the first buffer layer is disposed between the first lateral face and the side wall of the housing, between the first end face and the side wall of the housing, the third end face and the side wall of the housing, and between the fourth lateral face and the side wall of the housing.

15. The electronic device according to claim 14, further comprising a second buffer layer, and the second buffer layer is disposed between the first lateral face and the side wall of the housing, between the second end face and the side wall of the housing, the fourth end face and the side wall of the housing, and between the fourth lateral face and the side wall of the housing.

16. The electronic device according to claim 15, further comprising a third buffer layer, and the third buffer layer is disposed between the second lateral face and the third lateral face.

17. The electronic device according to claim 13, wherein a length of the first electrode assembly is greater than a length of the second electrode assembly, the battery cell further comprises a fourth adhesive layer, and the fourth adhesive layer is bonded to the first surface, a first end face, and the second surface.

18. The electronic device according to claim 10, wherein the accommodation cavity comprises a first accommodation cavity to accommodate the first electrode assembly and a second accommodation cavity to accommodate the second electrode assembly, the first accommodation cavity comprises a first bottom wall, the first surface faces towards the first bottom wall, the second accommodation cavity comprises a second bottom wall, and the third surface faces towards the second bottom wall.

19. The battery cell according, to claim 1, wherein
the first electrode assembly is formed by winding the first positive electrode plate, the first negative electrode plate and the first separator located between the first positive electrode plate and the first negative electrode plate;
the second electrode assembly is formed by winding the second positive electrode plate, the second negative electrode plate and the second separator located between the second positive electrode plate and the second negative electrode plate;
a finish end of the first electrode assembly is located on the second surface and a finish end of the second electrode assembly is located on the fourth surface; and
the first adhesive layer fixes the finish end of the first electrode assembly and fixes the finish end of the second electrode assembly.

20. The battery cell according to claim 1, wherein
the first electrode assembly is formed by winding the first positive electrode plate, the first negative electrode plate and the first separator located between the first positive electrode plate and the first negative electrode plate;
the second electrode assembly is formed by winding the second positive electrode plate, the second negative electrode plate and the second separator located between the second positive electrode plate and the second negative electrode plate;
a finish end of the first electrode assembly is located on the second surface and a finish end of the second electrode assembly is located on the third surface; and
the first adhesive layer fixes the finish end of the first electrode assembly.

* * * * *